US008830082B2

(12) United States Patent
Ku

(10) Patent No.: US 8,830,082 B2
(45) Date of Patent: Sep. 9, 2014

(54) WIDE-ANGLE LED WARNING APPARATUS

(71) Applicant: Chen-Kuo Ku, Taipei (TW)

(72) Inventor: Chen-Kuo Ku, Taipei (TW)

( * ) Notice: Subject to any disclaimer, the term of this patent is extended or adjusted under 35 U.S.C. 154(b) by 16 days.

(21) Appl. No.: 13/772,716

(22) Filed: Feb. 21, 2013

(65) Prior Publication Data

US 2014/0104069 A1    Apr. 17, 2014

(30) Foreign Application Priority Data

Oct. 12, 2012    (TW) .............................. 101219677 U

(51) Int. Cl.
*G09F 9/33* (2006.01)
*G08B 5/36* (2006.01)

(52) U.S. Cl.
CPC .... *G08B 5/36* (2013.01); *G09F 9/33* (2013.01)
USPC ...... 340/815.45; 340/467; 340/471; 340/475; 362/147; 362/235; 362/326; 362/327

(58) Field of Classification Search
CPC .................................... G08B 5/36; G09F 9/33
USPC ............. 340/815.45, 467, 471, 475; 362/147, 362/235, 326, 327
See application file for complete search history.

(56) References Cited

U.S. PATENT DOCUMENTS

| 5,567,036 A * | 10/1996 | Theobald et al. ............. 362/485 |
| 2006/0268565 A1* | 11/2006 | Chang ........................... 362/540 |
| 2008/0030991 A1* | 2/2008 | Yeh ................................ 362/249 |

* cited by examiner

*Primary Examiner* — Tai T Nguyen
(74) *Attorney, Agent, or Firm* — Kolisch Hartwell, P.C.

(57) ABSTRACT

A wide-angle LED warning apparatus has a heat sink base, a circuit board, multiple pillars, multiple LED devices and a transparent cover. The circuit board is mounted in the heat sink base. The pillars are formed in the heat sink base and each pillar respectively has an oblique surface, the oblique surfaces facing toward two opposite sides of the heat sink base. The LED devices mounted on a front surface of the circuit board and the oblique surfaces of the pillars. The transparent cover is mounted on the heat sink base. Hence, the LED warning apparatus of the invention can widely emit light due to the LED devices mounted on the oblique surfaces of the pillars to provide enhanced warning effect and security.

17 Claims, 4 Drawing Sheets

WIDE-ANGLE LED WARNING APPARATUS

CROSS-REFERENCE TO RELATED APPLICATIONS

This application claims the benefit of Taiwan patent application No. 101219677, filed on Oct. 12, 2012, the disclosure of which is incorporated herein in its entirety by reference.

BACKGROUND OF THE INVENTION

1. Field of the Invention

The present invention relates to a light apparatus, and more particularly to a wide-angle LED warning apparatus.

2. Description of Related Art

The LED (light emitting diode) device is widely applicable for illuminating apparatus or warning apparatus because of advantages such as tiny volume, low power consumption, long lifetime, etc. Take an LED warning apparatus for example. An LED warning apparatus mainly comprises a circuit board, multiple LED devices, a heat sink base and a transparent cover. A rear surface of the circuit board is mounted on the heat sink base. The LED devices are mounted on a front surface of the circuit board. The transparent cover is mounted on the heat sink base to cover the circuit board and the LED devices. The LED devices produce light for warning purposes. The heat sink base provides heat dissipation for the LED devices.

However, all of the LED devices are mounted on the front surface of the circuit board. The LED devices emit light in the forward direction only, such that the light projecting range is small. Due to the limited light projecting range, the warning light is not visually apparent enough for attracting people's attention, especially for people standing near two ends of the LED devices. As a result, the conventional LED warning apparatus cannot provide sufficient security.

SUMMARY OF THE INVENTION

An objective of the invention is to provide a wide-angle LED warning apparatus. Compared with the conventional LED warning apparatus, the light projecting range of the invention is expanded for efficiently attracting people's attention.

The wide-angle LED warning apparatus of the invention comprises:
  a heat sink base having a body with a connecting surface and two opposite sides;
  a circuit board having:
    a rear surface mounted on the connecting surface of the body; and
    a front surface having a normal line;
  multiple pillars formed on the two sides of the body of the heat sink base and respectively having an oblique surface having a normal line, wherein the oblique surfaces respectively face toward the two opposite sides of the body, and an acute angle is defined between the normal line of the oblique surface and the normal line of the connecting surface;
  multiple LED devices mounted on the front surface of the circuit board and the oblique surface of the pillars and electrically connected to the circuit board; and
  a transparent cover mounted on the body of the heat sink base to cover the circuit board, the pillars and the LED devices.

The LED device(s) mounted on the front surface of the circuit board can emit light in the forward direction. In addition, because the oblique surfaces of the pillars face outward, the LED devices mounted on the pillars can widely emit the light. Compared with the conventional LED warning apparatus, the light projecting range is expanded. The LED warning apparatus of the invention effectively attracts people's attention to provide enhanced security.

DETAILED DESCRIPTION OF THE PREFERRED EMBODIMENT

Figure 1:
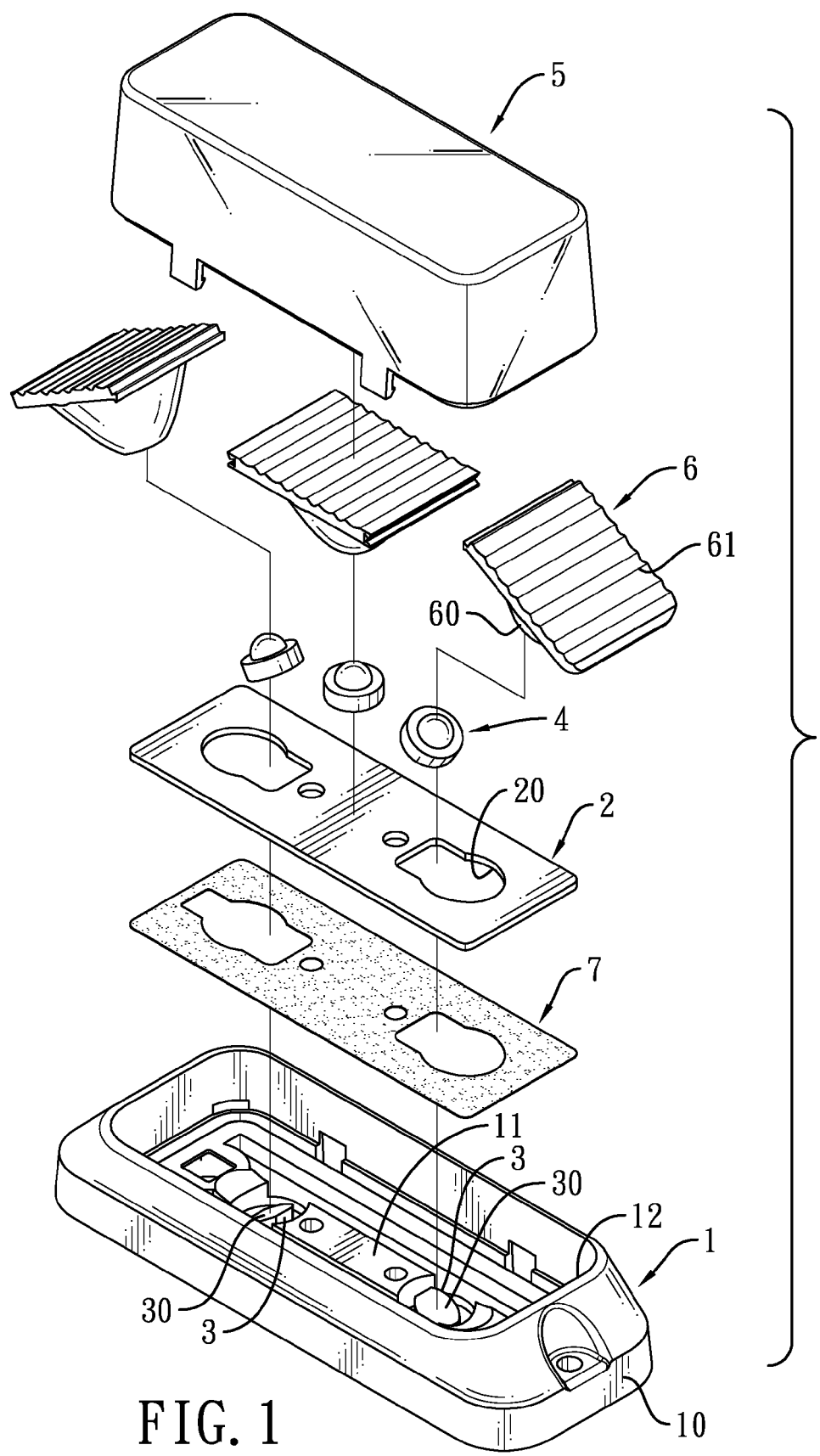
FIG. 1 is an exploded view of a first embodiment of the invention.

With reference to FIG. 1, a first embodiment of the wide-angle LED warning apparatus of the invention is disclosed. The warning apparatus comprises a heat sink base 1, a circuit board 2, multiple pillars 3, multiple LED devices 4 and a transparent cover 5. The LED warning light apparatus can further has multiple optical reflectors 6. The optical reflectors 6 correspond to the LED devices 4 in number.

Figure 2:
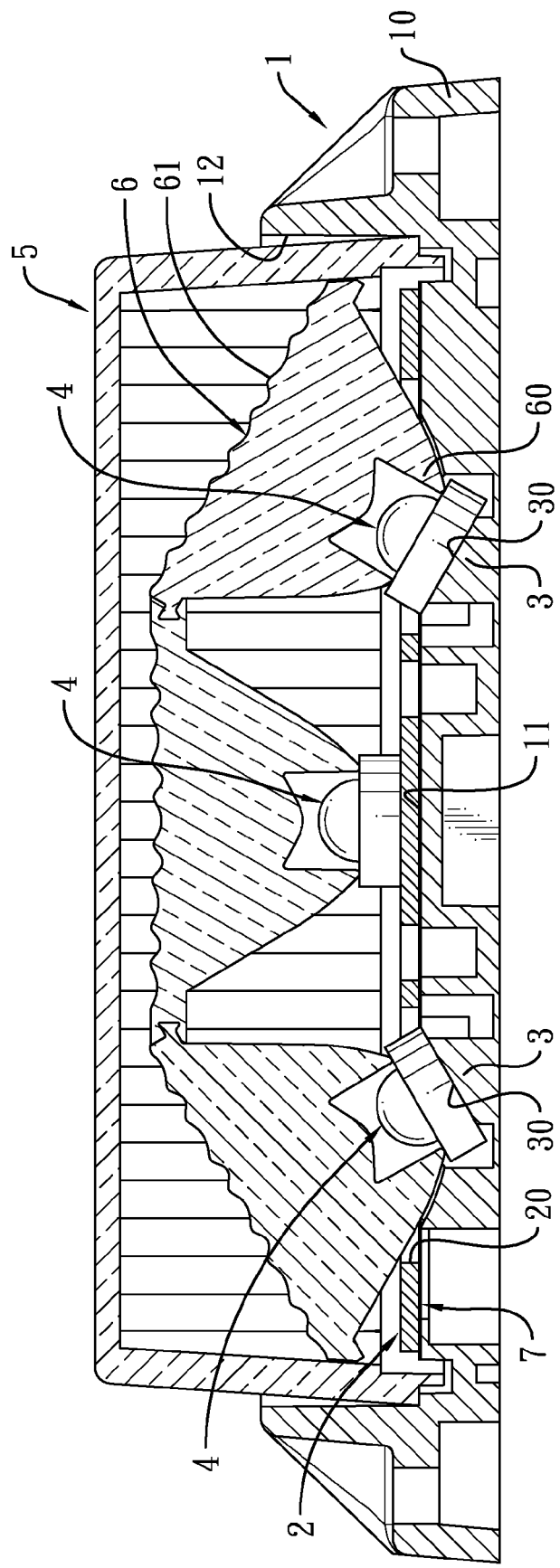
FIG. 2 is a cross-sectional view of the first embodiment of the invention.

With reference to FIGS. 1 and 2, the heat sink base 1 is made of heat sink materials and has a body 10. The body 10 has a mounting side and two opposite sides. The mounting side has a connecting surface 11. The body 10 can further has a mounting groove 12 formed in the mounting side. The connecting surface 11 is formed on a bottom of the mounting groove 12.

Figure 3:
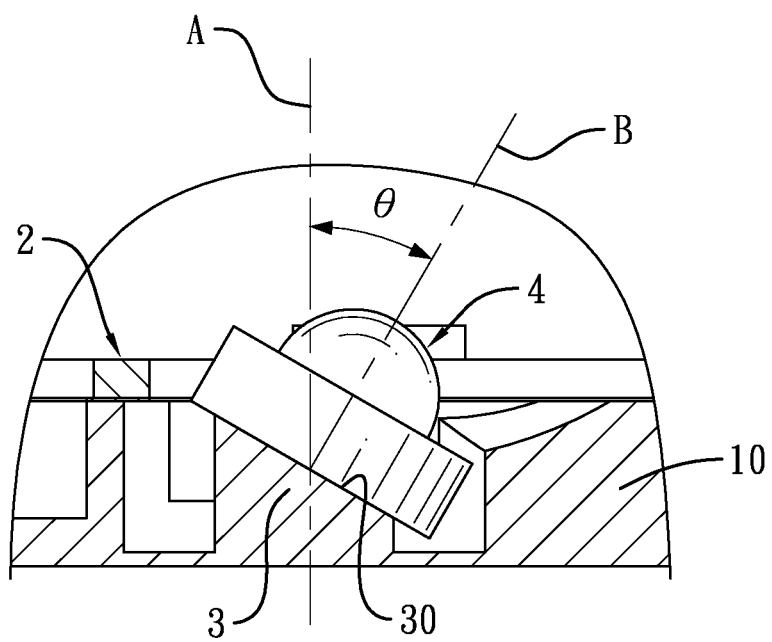
FIG. 3 is a partially enlarged view of FIG. 2.

The circuit board 2 is a plate with wire layout and is mounted in the mounting groove 12 of the heat sink base 1. The circuit board 2 has a front surface, a rear surface opposite to the front surface, and two ends. With reference to FIG. 3, the front surface of the circuit board 2 has a normal line as a direct projecting direction (A). The rear surface of the circuit board 2 is mounted on the connecting surface 11 of the body 10 and thermally contacts the connecting surface 11 of the heat sink base 1. The circuit board 2 can be mounted in the body 10 by mounting screws.

A partition 7 can be mounted between the rear surface of the circuit board 2 and the connecting surface 11 of the heat sink base 1. The partition 7 can be a plate made of materials that are thermally conductive and electrically insulating, such that the partition 7 provides high thermal conduction and electrically insulates the heat sink base 1 from the circuit board 2. With reference to FIGS. 1-3, the circuit board 2 further has two holes 20 respectively formed in the two ends.

The pillars 3 are made of thermally conductive materials and correspond to the two ends of the circuit board 2 in position. The pillars 3 can be integrally formed in the body 10 and respectively have an oblique surface 30 having a normal line as a lateral projecting direction (B). With reference to FIGS. 2 and 3, as an example, the apparatus of the first embodiment of the invention has two pillars 3 respectively formed on the two sides of the body 10. The oblique surfaces 30 of the pillars 3 respectively face toward the two opposite sides of the body 10. An acute angle is defined between the normal line of the oblique surface 30 and the normal line of the connecting surface 11. In this embodiment, the acute angle is between 10-45 degrees.

The LED devices 4 are mounted on the front surface of the circuit board 2 and the oblique surfaces 30 of the pillars 3.

Figure 4:
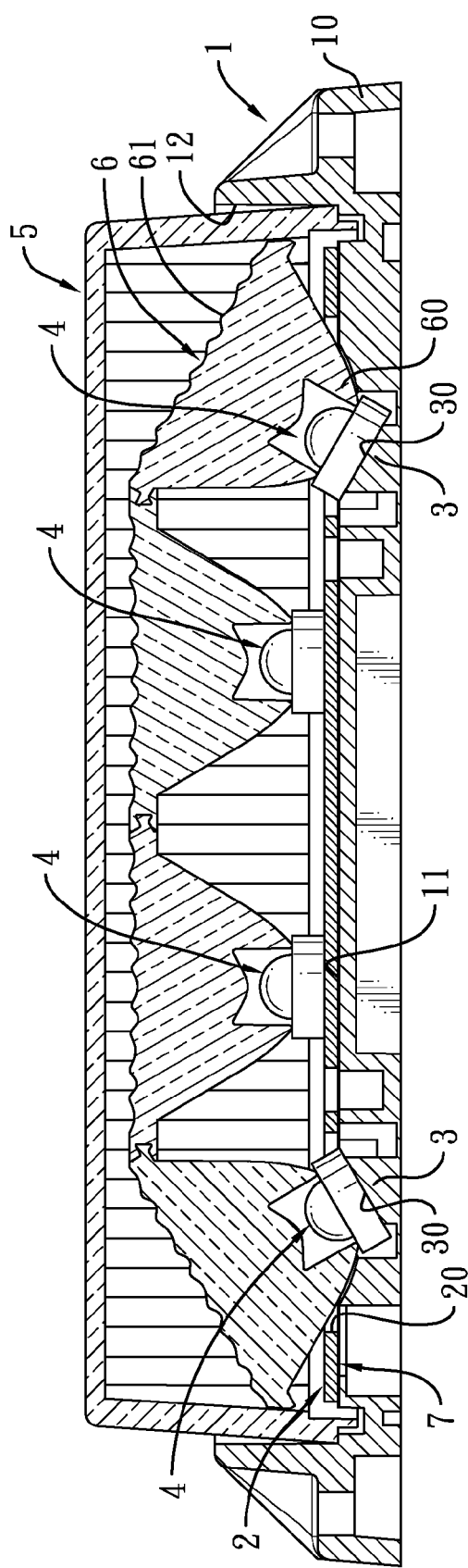
FIG. 4 is a cross-sectional view of a second embodiment of the invention.

With further reference to FIG. 4 of a second embodiment of the invention, there are two LED devices 4 mounted on the front surface of the circuit board 2 and the rest two LED devices 4 are respectively mounted on the oblique surfaces 30 of the pillars 3. Each LED device 4 has an anode terminal and a cathode terminal electrically connected to the wire layout of the circuit board 2. The LED devices 4 can receive a working voltage through the wire layout of the circuit 2 to be activated by the working voltage. The heat generated from the LED devices 4 dissipates through the pillars 3, the circuit board 2 and the heat sink base 1.

The optical reflector 6 is shaped like a cone and has a light entering surface 60 and a light exiting surface 61 opposite to the light entering surface 60. In this embodiment, the light exiting surface 61 is a wavy surface. The light entering surface 60 is mounted on the LED device 4, such that the light emitted from the LED device 4 enters the optical reflector 6 and is scattered through the optical reflector 6.

The transparent cover 5 is made of transparent materials. The transparent cover 5 is mounted on the body 10 of the heat sink base 1 to cover the circuit board 2, the pillars 3, the LED devices 4 and the optical reflectors 6. In this embodiment, the transparent cover 5 is inserted into the mounting groove 12 of the body 10. The transparent cover 5 can be engaged with the heat sink base 1 or mounted on the heat sink base 1 by mounting screws.

The LED warning light apparatus of the invention is applicable for vehicle or other equipments. The circuit board 2 is adapted to electrically connect to an external DC power supply, such that the LED devices 4 can be activated by a working voltage from the DC power supply. When the LED devices 4 are activated, the heat generated from the LED devices 4 effectively dissipates through the heat sink base 1. In addition, the LED devices 4 mounted on the oblique surfaces 30 of the two pillars 3 produce light at the lateral projecting direction (B), and the LED devices 4 mounted on the circuit board 2 produce light at the direct projecting direction (A). The light projecting range of the LED warning light apparatus of the invention is expanded based on the oblique surfaces 30. People in front of the LED warning light apparatus and near the LED warning light apparatus within 10-45 degrees can easily observe the light of the LED devices 4. The LED warning light apparatus of the invention provides enhanced warning effect and security.

What is claimed is:

1. A wide-angle LED warning apparatus comprising:
   a heat sink base having a body with a connecting surface and two opposite sides;
   a circuit board having:
      a rear surface mounted on the connecting surface of the body; and
      a front surface having a normal line;
   multiple pillars formed on the two sides of the body of the heat sink base and respectively having an oblique surface having a normal line, wherein the oblique surfaces respectively face toward the two opposite sides of the body, and an acute angle is defined between the normal line of the oblique surface and the normal line of the connecting surface;
   multiple LED devices mounted on the front surface of the circuit board and the oblique surface of the pillars and electrically connected to the circuit board; and
   a transparent cover mounted on the body of the heat sink base to cover the circuit board, the pillars and the LED devices.

2. The LED warning apparatus as claimed in claim 1, wherein two pillars are respectively formed on the two sides of the body of the heat sink base.

3. The LED warning apparatus as claimed in claim 2, wherein
   the circuit board has:
      two ends; and
      two holes respectively formed in the two ends; and
   the two pillars are integrally formed in the body and respectively correspond to the holes of the circuit board in position.

4. The LED warning apparatus as claimed in claim 3, wherein the acute angle is between 10-45 degrees.

5. The LED warning apparatus as claimed in claim 4, wherein
   the heat sink base has a mounting groove and the connecting surface is formed on a bottom of the mounting groove; and
   the transparent cover is inserted into the mounting groove.

6. The LED warning apparatus as claimed in claim 5, wherein a partition is mounted between the circuit board and the heat sink base to provide high thermal conduction and to electrically insulate the heat sink base from the circuit board.

7. The LED warning apparatus as claimed in claim 5 further comprising multiple optical reflectors corresponding to the LED devices in number, wherein the optical reflector has:
   a light entering surface; and
   a light exiting surface opposite to the light entering surface and mounted on the LED device.

8. The LED warning apparatus as claimed in claim 7, wherein the light exiting surface is a wavy surface.

9. The LED warning apparatus as claimed in claim 3 further comprising multiple optical reflectors corresponding to the LED devices in number, wherein the optical reflector has:
   a light entering surface; and
   a light exiting surface opposite to the light entering surface and mounted on the LED device.

10. The LED warning apparatus as claimed in claim 9, wherein the light exiting surface is a wavy surface.

11. The LED warning apparatus as claimed in claim 1, wherein the acute angle is between 10-45 degrees.

12. The LED warning apparatus as claimed in claim 11, wherein
   the heat sink base has a mounting groove and the connecting surface is formed on a bottom of the mounting groove; and
   the transparent cover is inserted into the mounting groove.

13. The LED warning apparatus as claimed in claim 12, wherein a partition is mounted between the circuit board and the heat sink base to provide high thermal conduction and to electrically insulate the heat sink base from the circuit board.

14. The LED warning apparatus as claimed in claim 12 further comprising multiple optical reflectors corresponding to the LED devices in number, wherein the optical reflector has:
   a light entering surface; and
   a light exiting surface opposite to the light entering surface and mounted on the LED device.

15. The LED warning apparatus as claimed in claim 14, wherein the light exiting surface is a wavy surface.

16. The LED warning apparatus as claimed in claim 1 further comprising multiple optical reflectors corresponding to the LED devices in number, wherein the optical reflector has:
   a light entering surface; and
   a light exiting surface opposite to the light entering surface and mounted on the LED device.

17. The LED warning apparatus as claimed in claim 16, wherein the light exiting surface is a wavy surface.

* * * * *